Aug. 16, 1949.　　　　C. R. RAMSEY　　　　2,479,405
CENTERING PRESSURE CHUCK
Filed April 4, 1946
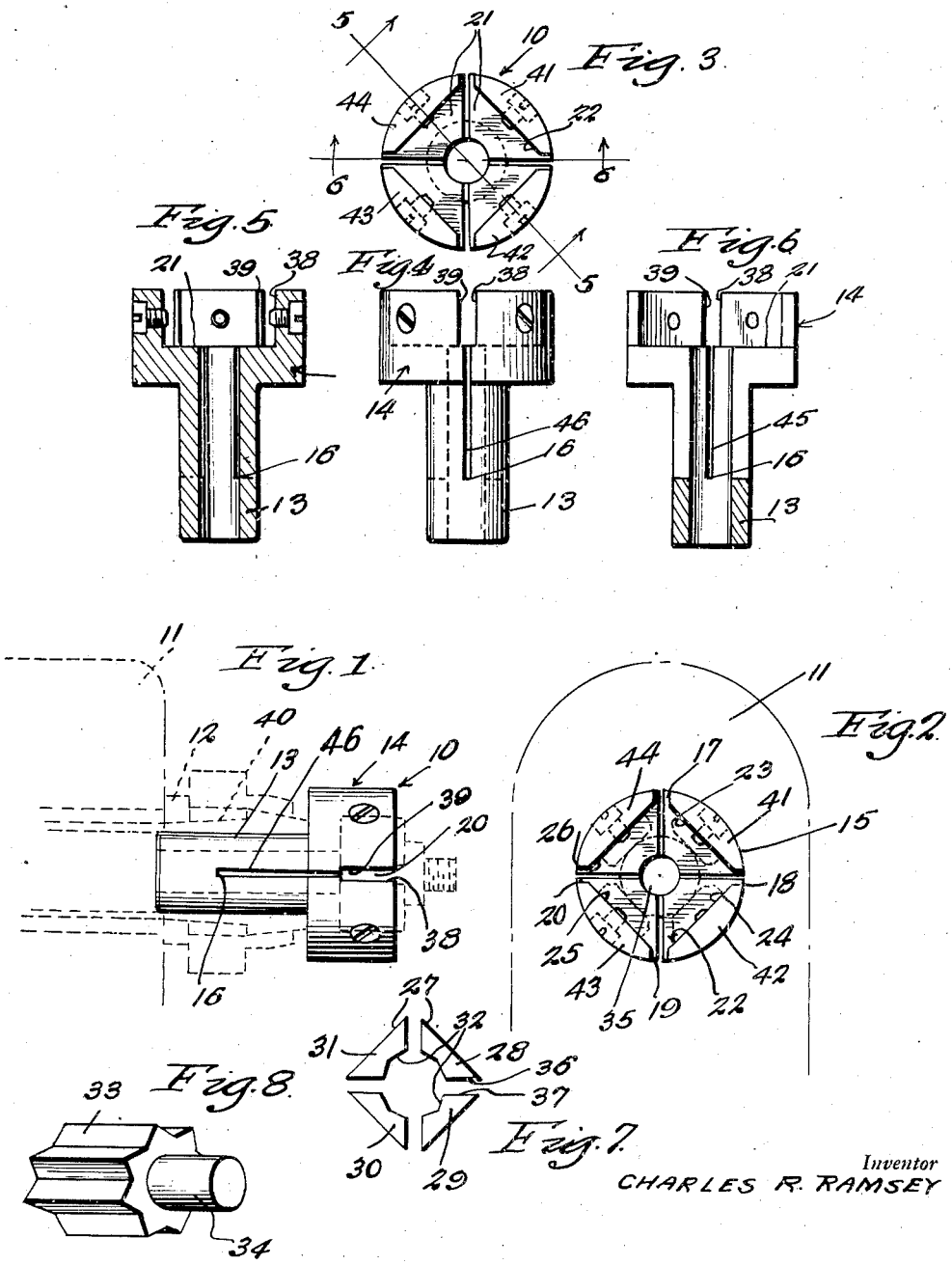
Inventor
CHARLES R. RAMSEY
By Clarence A. O'Brien
and Harvey B. Jackson
Attorneys Patented Aug. 16, 1949

2,479,405

UNITED STATES PATENT OFFICE 2,479,405

CENTERING PRESSURE CHUCK

Charles R. Ramsey, Pittsfield, Mass.

Application April 4, 1946, Serial No. 659,547

2 Claims. (Cl. 279—46)

1

The invention as described herein, and illustrated in the accompanying drawings, consists of a chuck, an object of which is to provide a device adapted to securely grip work of various kinds, sizes, and configuration.

Another object of the invention is to provide a chuck for holding work to be held by a screw machine or other chuck either manual or mechanical.

Other features and advantages will become more readily apparent from the following description and the accompanying illustrative drawings in which:

Figure 1 is a diagrammatic view illustrating the application of the invention,

Figure 2 is a face view thereof,

Figure 3 is a face view of the device,

Figure 4 is an elevational view of Figure 3,

Figure 5 is a sectional view taken on line 5—5 of Fig. 3,

Figure 6 is a similar view taken on line 6—6 of Figure 3,

Figure 7 is a detail plan view of a set of detachable jaws, and

Figure 8 is a perspective view of a piece of work.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention in its entirety and 11 indicates a screw machine or any other machine carrying a tool holding chuck 12 by which the shank 13 of a work supporting chuck 14 may be held.

The chuck 14 is provided with an enlarged cupped head 15 from which said shank 13 extends.

The head and shank to the point 16 is quartered, providing slots 17 and 18 opposing each other in the head and also opposing slots 19 and 20 therein, all of said slots being of greater width to the bottom wall 21 of the head, than from this point to the inner end of each slot. The recess 22 of the head is rectangular and has vertical walls 23, 24, 25 and 26 against which walls the outer sides 27 of the jaws 28, 29, 30 and 31 are adapted to seat. These jaws may be of any desired configuration on their surfaces 32, but all of the walls 27 thereof are flat and conform to the walls 23, 24, 25 and 26 of the said head. These jaws are adapted to grip work of various configurations, such for instance as the member 33, which would be held within the bore 35 formed by the combined surfaces 32 of said jaws. However, these same jaws would hold sheet material which would be gripped between the opposing edges 36 and 37 of said jaws and the sides 38 and 39 of said head. When work is placed between the jaws of the chuck 10 and the centering screws of this chuck properly tightened and the shank of this chuck is placed within the chuck 40 and the jaws of the chuck 40 clamped upon the shank 13, the segments 41, 42, 43 and 44 of the chuck 14 will be closed in upon the said jaws 28, 29, 30 and 31 which as well as said segments will be clamped upon the work whereby the same will be securely held for operation thereon. The longitudinal slots 45 and 46 of the shank 13 will provide sufficient flexibility for the clamping of the chuck segments upon said jaws.

From the foregoing it will be seen that I have provided a work holding chuck arranged to grip work of many different forms. The jaws will be provided in sets for use with work of different shapes and dimensions and the device may be used with certain types of work without the jaws, the work being directly engaged by the centering screws.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is though that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention, that which is claimed to be new and desired to be procured by Letters Patent is:

1. A centering pressure chuck for use with the chuck of a machine tool, comprising a cupped head and integral shank, said head and a portion of said shank being split, replaceable jaws within said head to grasp work of corresponding configuration, centering screws in said head to adjust said jaws for centering the work in said head, the clamping of said chuck of the machine tool on the shank of the second-mentioned chuck collapsing said split shank portion, head and jaws to further tighten said work therein.

2. A centering pressure chuck for use with the chuck of a machine tool, comprising a cupped head and integral shank, said head and a portion of said shank being split, radially disposed centering screws in said head for centering work in said head, the clamping of said chuck of the machine tool on the shank of the second-mentioned chuck collapsing said split shank portion, head and jaws to further tighten said work in the second-mentioned chuck.

CHARLES R. RAMSEY.

REFERENCES CITED

The following references are of record in the file of this patent:

UNITED STATES PATENTS

| Number | Name | Date |
|---|---|---|
| 884,125 | Brightman | Apr. 7, 1908 |
| 1,125,780 | Waite | Jan. 19, 1915 |
| 1,898,264 | Proafke | Feb. 21, 1933 |
| 2,219,008 | Drissner | Oct. 22, 1940 |
| 2,277,260 | Shaffer | Mar. 24, 1942 |
| 2,291,397 | Martin | July 28, 1942 |
| 2,343,570 | Nelson | Mar. 7, 1944 |

OTHER REFERENCES

American Machinists, August 14, 1947, page 123, 279–67. (Copy in Division 52.)